June 29, 1943.  P. T. HAHN  2,322,932
ELECTRIC MOTOR COOLING
Filed Dec. 14, 1939  2 Sheets-Sheet 1

INVENTOR
Paul T. Hahn
BY
Harry S. Dumarse
ATTORNEY

June 29, 1943.  P. T. HAHN  2,322,932
ELECTRIC MOTOR COOLING
Filed Dec. 14, 1939  2 Sheets-Sheet 2

INVENTOR
Paul T. Hahn
BY
Harry S. Ducarse
ATTORNEY

Patented June 29, 1943

2,322,932

UNITED STATES PATENT OFFICE 2,322,932

ELECTRIC MOTOR COOLING

Paul T. Hahn, North Canton, Ohio, assignor to The Hoover Company, North Canton, Ohio, a corporation of Ohio Application December 14, 1939, Serial No. 309,197

8 Claims. (Cl. 172—36)

The present invention relates to suction cleaners in general and more particularly to a new and novel motor cooling ventilating system in a suction cleaner.

It is an object of the present invention to provide a new and improved suction cleaner. Another object is to provide a new and improved motor cooling system in a suction cleaner. A further object is to provide a new and improved field coil spool having passageways for cooling a suction cleaner motor. A still further object is to provide an improved field coil spool having passageways communicating with ventilating passageways in the suction cleaner for cooling the motor. Another object is to provide a field coil spool having passageways for cooling the field stack and also the field windings. Other advantages and objects of the invention will be apparent from the following specification and drawings, wherein:

Figure 1:
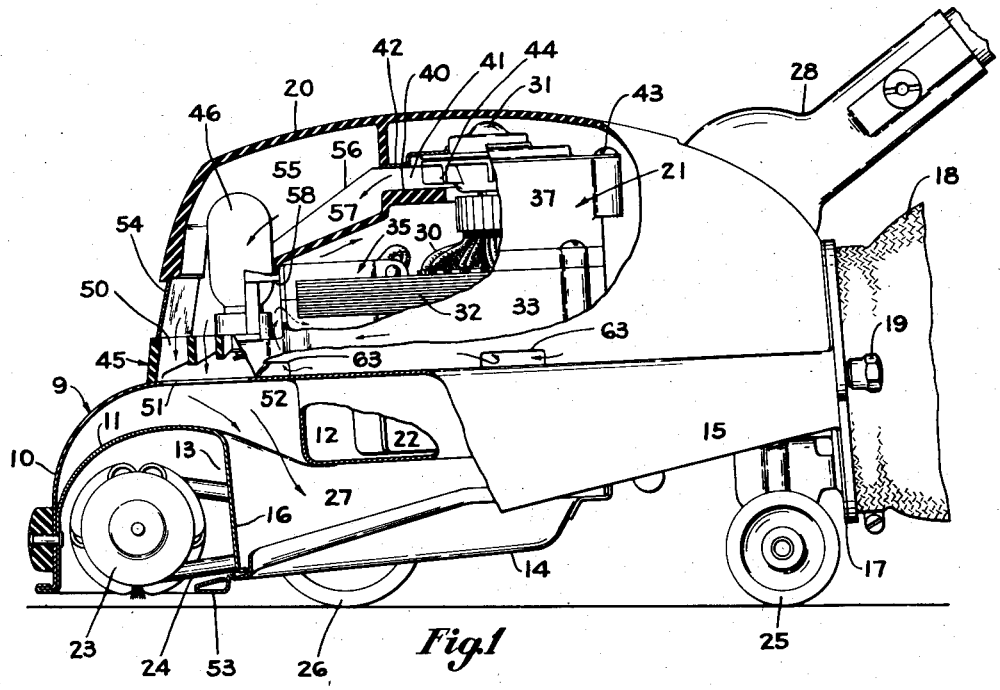
Figure 1 is a side elevation of a suction cleaner embodying the present invention with certain parts of the cleaner casing broken away.
Figure 2:
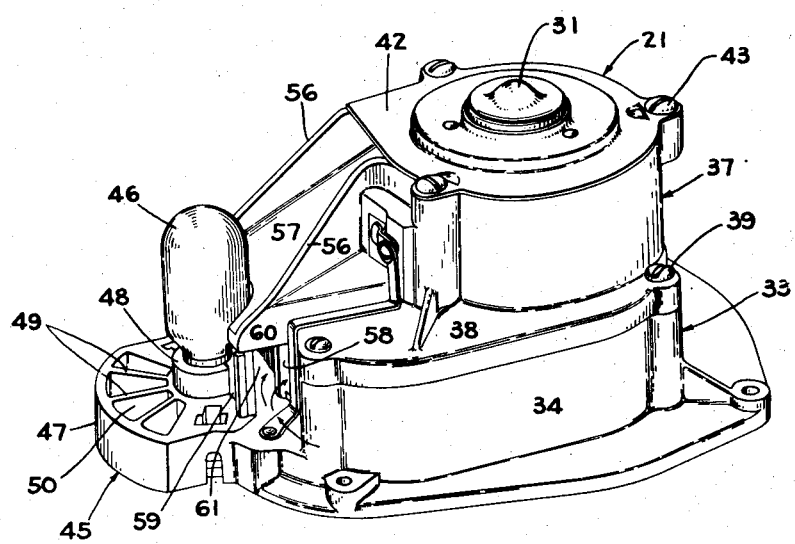
Figure 2 is a perspective view of the ventilating passageways in the motor.

The embodiment of the invention herein disclosed comprises a suction cleaner having a main casing 9 provided with a nozzle 10 of double wall construction, the inner wall being indicated by the reference character 11. A fan chamber 12 is interiorly connected to the nozzle 10 by a suction passageway 13 which is preferably formed integrally with the inner wall 11 and a removable bottom plate 14. The main casing is completed by the overhanging side walls 15 which extend from the nozzle in spaced relation from the side walls 16 of the suction passageway 13, the fan chamber 12 and then to the exhaust flange 17 to which a filter bag 18 is removably attached by manual operable means 19.

A motor housing 20 enclosed a motor 21 mounted on the cleaner casing 9 and rotates a fan 22 to draw dirt-laden air through the nozzle 10 and to exhaust it into the filter bag 18. Rotatably mounted in the nozzle 10 is a surface-contacting member 23 which is driven by a belt 24 having operative connection with the motor 21. The cleaner is movably supported on rear wheels 25 and front wheels 26, the latter being positioned in wheel pockets 27 defined by the spaced walls 16 of the suction passageway 13 and the skirt 15 of the casing, and the cleaner is propelled over the surface to be cleaned by a handle 28.

The motor 21 comprises an armature 30 rotatably supported at its upper and lower ends by suitable bearing means, the upper bearing being indicated at 31. The motor stator 32 is supported on a bottom plate 33 of insulation material formed with side walls 34 which surround the stator 32. A field coil spool 35 and windings 36 are arranged about the field stack 32 and supported on the latter. An upper motor casing section 37, also of insulating material, is formed with a peripheral flange 38 which seats upon the bottom plate 33 and is removably attached thereto by screws 39. Adjacent to its top, the upper motor casing section 37 is formed with an internal horizontal wall 40 which encloses the armature 30 to provide upon itself a ventilating fan chamber 41, the upper side of which is formed by a removable metal plate 42 which carries the motor bearing 31 and which is secured to the upper motor casing section 37 by screws 43. A motor ventilating fan 44 carried by the rotor 30 is positioned within the chamber 41.

Formed upon the motor bottom plate 33, and more specifically upon the forward side thereof exteriorly of the vertical wall 34 which seats and encloses the stator 32, is a platform 45 which supports an electric bulb 46. The curved forward end 47 of the platform 45 is spaced from the bulb-carrying portion 48 of the platform and is connected thereto by a series of integral radially extending vertical webs 49. These vertical connectors 49 define openings 50 in the platform 45 which lead directly to a port 51 formed below the platform in the top wall of the main casing 9 and connects with the space 52 between the outer wall 10 and the inner wall 11 of the nozzle, and also connects with the wheel pockets 27 directly behind the rear nozzle lip 53.

The motor hood 20 is cut out above the forward curved wall 47 of the platform 45, as indicated at 54, to provide an opening forward of the bulb 46. A transparent window, such as Celluloid, is positioned in the opening 54 through which light rays from the bulb 46 are directed forwardly of the nozzle and onto the surface covering undergoing cleaning.

An air passageway is formed from the ventilating fan chamber 41 by spaced cooperating vertical walls 55, 56 on the motor hood 20 and the upper motor casing section 37, respectively. These cooperating side walls provide a passageway 57 which leads directly from the exhaust outlet of the ventilating fan chamber 41 around the bulb 46 to the ports 50 in the platform 45.

An inlet port 58 is formed in the walls of the motor casing sections 33 and 37, behind the bulb 46. This opening is substantially the length and height of the field coil spool 35 and directly exposes the windings on the latter. A partition 59 is supported on the platform 45 behind the bulb 46 and bears against the overhanging inclined wall 60 of the upper motor casing section 37, to provide a chamber 61 entrance to which is had at opposite ends of the partition 59. The motor hood 20 abuts the opposite ends of the partition 59 to provide a confined ventilating passageway between the motor 21 and the motor hood 20, this passageway being not directly connected with the ports 50 in the platform 45. Inlet ports 63 for the motor cooling air are formed in the lower marginal edge of the motor hood 20. The air first enters through the ports 63 and then passes about the motor casing into the opposite entrances to the chamber 61 and thence to the opening 58 to gain direct contact with the exterior surface of the motor windings 36 and then to the ventilating fan chamber 41.

Figure 3:
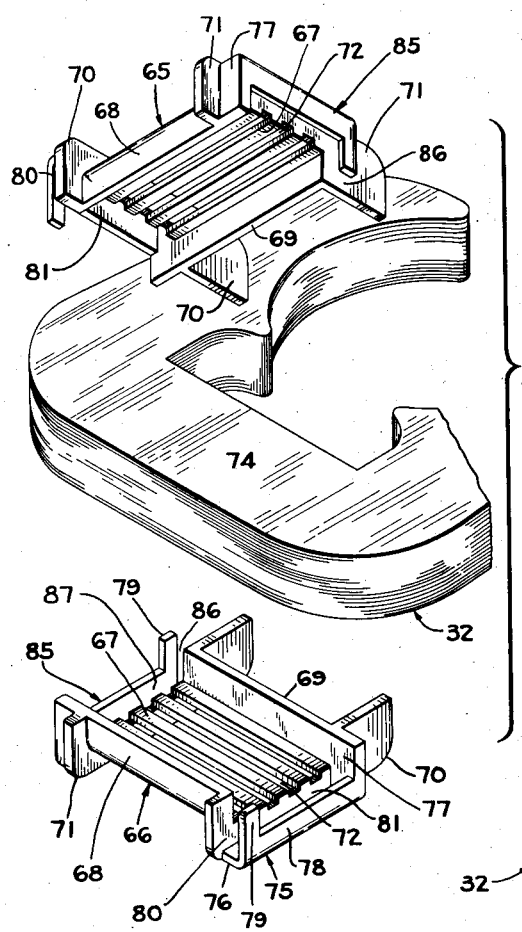
Figure 3 is an exploded perspective view of the field coil spool having passageways for cooling the field stack and the field winding.
Figure 4:
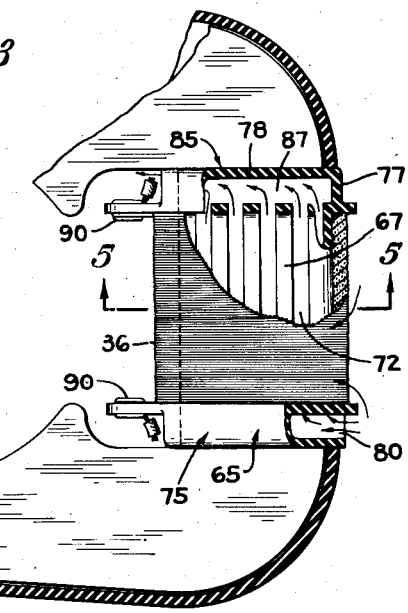
Figure 4 is a sectional view showing the passageways for cooling the field stack and the field windings.
Figure 5:
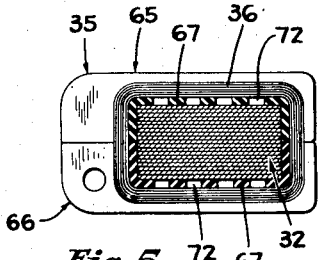
Figure 5 is a section along the line 5—5 of Figure 4.
Figure 6:
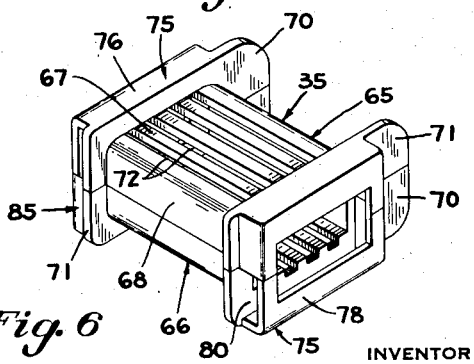
Figure 6 is a perspective view of the assembled field coil spool.

In order to cool the inner surfaces of the field windings 36 and the adjacent enclosed portions of the field stack 32, the field coil spool 35 is constructed as shown in Figures 3 to 6. The spool 35 is composed of two complementary identical sections 65 and 66 which are arranged about the field stack 32. Each spool section is provided with a substantially U-shaped core having a bottom wall 67 and side walls 68 and 69, and extending vertically from these walls is a pair of spaced flanges 70 and 71 between which the field windings are coiled. The bottom wall 67 is provided with a plurality of spaced slots 72 extending throughout the thickness of the bottom wall 67 and longitudinally of the latter between the flanges 70 and 71. The slots 72 define ventilating passageways which expose the interior field windings 36 and the adjacent surfaces 74 of the field stack 32 to ventilating air. Formed integrally with each flange 70 is a ventilating housing 75 which has a top wall 76 flush with the flange 70, a closed side wall 77 and an end wall 78 provided with a depending portion 79 cooperating with the flange 70 to form an entrance 80 which is directly connected to the opening 58 in the motor housing and with a chamber 81 connected with all the passageways 72. A pair of ventilating housings 85 are arranged adjacent the diagonally opposite flanges 71 on the spool sections 65 and 66, and are similar to the ventilating housings 75 hereinbefore described with the exception that the outlets 86 are adjacent the armature 30 and are connected to chambers 87 which are connected with the passageways 72.

The entrances 80 in each spool section 65 and 66, respectively, are at diagonally opposite ends of the spool and the outlets 86 in each spool section are at diagonally opposite ends of the spool, whereby the cooling air will pass in opposite directions along the top and bottom surfaces 74 of the field stack 32 and be discharged at opposite ends of the spool at points adjacent to the armature 30. Terminal means 90 are provided on the spool flanges 70 and 71 for connecting the field windings 36 with the motor circuit.

When the cleaner is in operation the motor 21 rotates the surface contacting means 23 and the fan 22 to remove the dirt from the surface covering being cleaned, and the dirt-laden air is discharged into the dust bag 18. The rotation of the motor generates heat and this heat is carried away by cooling air which is circulated by the ventilating fan 44. Cooling air circulated by the fan 44 is drawn into the motor hood 20 through the ports 63 and about the motor casing to the partition 59 and enters both ends of the chamber 61 and thence through the opening 58 opposite the field windings 36. Some of this air passes above and below the exterior surfaces of the field windings 36 and the stator 32 and about the armature 30 into the ventilating chamber 41. Part of the cooling air entering the opening 58 also passes into the diagonally arranged openings 80 of the spool 35, and thence into the chambers 81 which act as manifolds and distribute the air into the passageways 72 in each spool section. The air in these passageways 72 in each spool section 65 and 66 flows in separate paths and in opposite directions, and cools the adjacent field stack 32 and the interior of the field windings 36 since the passageways 72 in each spool section are partly formed by the field windings 36 and the field stack 32. The air is discharged through the diagonally arranged outlets 86 in the spool 35 at points adjacent the armature 30 and is drawn into the ventilating chamber 41. The ventilating fan 44 exhausts the cooling air into the passageway 57 which directs the air over the bulb 46, through the openings 50 in the platform 45 and downwardly into the space 52 between the outer nozzle wall 10 and the top wall 11 of the air passageway 13. The air then divides, part going into each wheel pocket 27 behind the rear lip 53 of the nozzle.

From the foregoing it will be perceived that the motor ventilating system herein provided cools the exterior and interior windings of the field coil, and that the field stack adjacent the windings where the stack is subjected to the greatest heat is also cooled.

If desired the spool sections 65 and 66 may be formed to arrange the entrances 80 to each ventilating chamber 75 above each other and at one end of the spool, and the outlets 86 from the ventilating chambers 85 arranged above each other at the opposite end of the spool, whereby the cooling air in the passageways 72 will flow in one direction and discharge the air in the vicinity of the armature 30.

It is to be understood that the protection herein applied for is not confined to the particular combinations of features or elements set out in the following claims. Protection is herein applied for for any one or more of the features or elements referred to in the following claims, or described in the foregoing specifications or shown in the accompanying drawings, either independently or in combination.

I claim:

1. In a dynamo-electric machine having a field core and a winding thereon, means interposed between said core and adjacent winding defining air passageways therebetween to expose said winding and adjacent core, and manifold means defining an entrance and outlet to said passageways whereby air is distributed through the latter to cool the exposed winding and adjacent core.

2. In a dynamo-electric machine having a field core, a spool on said core, a winding on said spool, means in said spool defining air passageways therein to expose the adjacent winding and core, means in said spool defining an air receiving manifold chamber communicating with said passageways to distribute air thereto, and means defining a manifold outlet for said air passageways whereby air passes through the latter to cool said exposed winding and core.

3. In a dynamo-electric machine having a field core, a spool on said core, a winding on said spool, means in said spool to define air passageways therein exposing the adjacent winding and core, means in said spool cooperating with an exposed portion of said core to define an air receiving manifold chamber communicating with said passageways to distribute air thereto, and means defining a manifold outlet for said passageways, whereby air passes through said chamber and passageways to cool said exposed winding and core.

4. In a dynamo-electric machine having a field core, a self-contained spool formed from two complementary parts mounted about said core, a winding on said spool, means defining slots in each of said spool parts, said winding and core cooperating with said slot means to define air passageways, and means in said two part spool defining an inlet and outlet to said passageways for passing air through the latter to cool the winding and core forming part of said passageways.

5. In a dynamo-electric machine, a field core, a spool mounted about said field core and comprising two complementary spool sections embracing said field core, a winding about said spool, means in said spool defining slots exposed to said field core and winding to provide air passageways therebetween, and means in said spool cooperating with said field core to define a manifold chamber communicating with said passageways and the atmosphere for receiving cooling air and directing the latter into said passageways to cool said field core and its adjacent winding.

6. In a suction cleaner, a motor having a field stack and armature, a spool about said stack, a winding on said spool, a system of air conducting passageways extending from the exterior of said motor to the motor armature, means in said spool defining air channels exposing said stack and its adjacent winding, said channels being included in said air passageways, means on said spool defining an entrance to said channels for ventilating air in said passageways, and means on said spool defining an outlet from said channels for discharging the air in the vicinity of the motor armature.

7. In a suction cleaner, a motor having a field stack and armature, a spool about said stack, a winding on said spool, means in said spool defining air channels exposing said stack and its adjacent winding, a system of air conducting passageways extending from the exterior of said motor to said air channels in said spool and thence to the motor armature, whereby air passes through said channels to cool said stack and its adjacent winding prior to cooling the motor armature.

8. In a dynamo-electric machine having a field core and a winding thereon, means interposed between said core and adjacent winding defining air channels exposed to said winding and adjacent core, means for leading air to some of said air channels for movement in one direction to cool the adjacent core and winding, and means for leading air to other of said air channels for movement in another direction to cool the adjacent core and winding.

PAUL T. HAHN.